US009904457B2

(12) United States Patent
Colley

(10) Patent No.: US 9,904,457 B2
(45) Date of Patent: Feb. 27, 2018

(54) CAUSING DISPLAY OF A THREE DIMENSIONAL GRAPHICAL USER INTERFACE WITH DYNAMIC SELECTABILITY OF ITEMS

(75) Inventor: Ashley Colley, Oulu (FI)

(73) Assignee: Nokia Technologies Oy, Espoo (FI)

( * ) Notice: Subject to any disclaimer, the term of this patent is extended or adjusted under 35 U.S.C. 154(b) by 113 days.

(21) Appl. No.: 13/455,669

(22) Filed: Apr. 25, 2012

(65) Prior Publication Data

US 2013/0285920 A1 Oct. 31, 2013

(51) Int. Cl.
*G06F 3/041* (2006.01)
*G06F 3/0488* (2013.01)
*G06F 3/0481* (2013.01)
*G06F 3/0484* (2013.01)

(52) U.S. Cl.
CPC ........ *G06F 3/0488* (2013.01); *G06F 3/04815* (2013.01); *G06F 3/04842* (2013.01)

(58) Field of Classification Search
CPC ............... G06F 3/0448; G06F 3/04883; G06F 3/04886; G06F 3/0488; G06F 3/04842; G06F 3/04815; G06F 3/044; G06F 3/0436; G06F 3/0433; G06F 3/0418; G06F 3/033; G02B 6/2852; H03K 2217/96011
USPC ....................................................... 345/173
See application file for complete search history.

(56) References Cited

U.S. PATENT DOCUMENTS

| 2002/0140698 A1 | 10/2002 | Robertson et al. |
| 2004/0100479 A1 | 5/2004 | Nakano et al. |
| 2006/0107235 A1* | 5/2006 | Esaki et al. ................ 715/824 |
| 2009/0150775 A1 | 6/2009 | Miyazaki et al. |

(Continued)

FOREIGN PATENT DOCUMENTS

| CN | 102402379 A | 4/2012 |
| EP | 2 068 237 A2 | 6/2009 |

(Continued)

OTHER PUBLICATIONS

International Search Report and Written Opinion for Application No. PCT/FI2013/050455, dated Jul. 17, 2013.

(Continued)

*Primary Examiner* — Temesghen Ghebretinsae
*Assistant Examiner* — Yaron Cohen
(74) *Attorney, Agent, or Firm* — Alston & Bird LLP

(57) ABSTRACT

An apparatus comprises at least one processor and at least one memory including computer program code, the at least one memory and the computer program code configured to, with the at least one processor, cause the apparatus to cause a view of a three-dimensional graphical user interface to be displayed on a touch-sensitive display, the three-dimensional graphical user interface comprising a three-dimensional arrangement of a plurality of graphical objects, each of the graphical objects, when displayed, having an associated display parameter, to identify at least one graphical object for which the associated display parameter satisfies a predetermined criterion, and to enable individual selectability in respect of the identified at least one graphical object, wherein each individually selectable graphical object is selectable with a touch input and wherein individually selecting a graphical object with a touch input causes an (Continued)

action to be performed in respect of the selected graphical object.

21 Claims, 12 Drawing Sheets

(56) References Cited

U.S. PATENT DOCUMENTS

| | | |
|---|---|---|
| 2010/0115407 A1 | 5/2010 | Kim et al. |
| 2010/0115471 A1* | 5/2010 | Louch et al. ................ 715/849 |
| 2011/0041098 A1 | 2/2011 | Kajiya et al. |
| 2011/0187661 A1* | 8/2011 | Wakizaka et al. ............ 345/173 |
| 2012/0062549 A1 | 3/2012 | Woo et al. |
| 2012/0200606 A1* | 8/2012 | Jetha et al. ................... 345/660 |
| 2013/0176261 A1 | 7/2013 | Kajiyama |
| 2014/0129990 A1* | 5/2014 | Xin ......................... G06F 3/017 |
| | | 715/849 |
| 2014/0223381 A1* | 8/2014 | Huang et al. ................. 715/863 |

FOREIGN PATENT DOCUMENTS

| | | |
|---|---|---|
| JP | 2003/005878 A | 1/2003 |
| WO | WO 2012/039288 A1 | 3/2012 |

OTHER PUBLICATIONS

Office Action from corresponding Japanese Patent Application No. 2015-507567 dated Jul. 6, 2016.
Communication under Rule 71(3) EPC of Intention to Grant a Patent for European Patent Application No. 13722791.4 dated May 12, 2017, 6 pages.
Office Action for Chinese Patent Application No. 201380033668.X, dated Jul. 20, 2017, with English translation, 8 pages.

* cited by examiner

CAUSING DISPLAY OF A THREE DIMENSIONAL GRAPHICAL USER INTERFACE WITH DYNAMIC SELECTABILITY OF ITEMS

FIELD

This specification relates to generally to causing display of a three dimensional graphical user interface and more particularly to causing display of a three dimensional graphical user interface on a touch sensitive device.

BACKGROUND

One main benefit of three-dimensional (3D) graphical user interfaces (GUIs) is that they are potentially able to present more graphical information/objects than two-dimensional (2D) GUIs. Currently, most 3D GUI interaction is performed using gaming consoles or personal computers (PCs). In these environments, it is possible to move a cursor or a focus to highlight even very small visual items in the GUI and subsequently to interact with them. This results in the case that all clearly visible items can be directly interacted with. However touch-screen interaction is different. Where objects are interacted with by touch inputs, the ability to interact with or select an object is limited by finger size. 3D GUIs can include objects that are too small to be interacted with accurately.

SUMMARY

In a first aspect, this specification describes apparatus comprising at least one processor and at least one memory including computer program code, the at least one memory and the computer program code configured to, with the at least one processor, cause the apparatus to cause a view of a three-dimensional graphical user interface to be displayed on a touch-sensitive display, the three-dimensional graphical user interface comprising a three-dimensional arrangement of a plurality of graphical objects, each of the graphical objects, when displayed, having an associated display parameter, to identify at least one graphical object for which the associated display parameter satisfies a predetermined criterion, and to enable individual selectability in respect of the identified at least one graphical object, wherein each individually selectable graphical object is selectable with a touch input and wherein individually selecting a graphical object with a touch input causes an action to be performed in respect of the selected graphical object.

The at least one memory and the computer program code may be configured, with the at least one processor, to cause the apparatus to adapt the appearance of the identified at least one graphical object so as to indicate to a user that the graphical object is individually selectable. The at least one memory and the computer program code may be configured, with the at least one processor, to cause the apparatus to identify a plurality of the graphical objects for which the associated display parameter does not satisfy the predetermined criterion and to cause the three-dimensional arrangement of graphical objects to be adapted by causing the identified plurality of graphical objects for which the associated display parameter does not satisfy the predetermined criterion to be moved into a cluster. The at least one memory and the computer program code may be configured, with the at least one processor, to cause the apparatus to enable selectability of the cluster via a touch input. The at least one memory and the computer program code may be configured, with the at least one processor, to cause the apparatus to receive a signal indicative of a touch input having been received in respect of the cluster, to respond by changing the point from which the adapted three-dimensional arrangement is viewed until the display parameters associated with each of the graphical objects in the cluster satisfy the predetermined criterion, and to enable the individual selectability of the each of the graphical objects in the cluster.

The at least one memory and the computer program code may be configured, with the at least one processor, to cause the apparatus to cause a handle to be displayed in association with each of the graphical objects for which the display parameter does not satisfy the predetermined criterion, wherein a display parameter associated with at least part of the handle satisfies the predetermined criterion, and to enable selectability of the handle associated with each graphical object.

The at least one memory and the computer program code may be configured, with the at least one processor, to receive a signal indicative a request to change the point from which the three-dimensional graphical user interface is viewed, to respond by causing a changed view of the three-dimensional graphical user interface to be displayed on the touch-sensitive display, to calculate an interaction metric in respect of the changed view, and to optimise the interaction metric by automatically adjusting the point from which the three-dimensional graphical user interface is viewed or by adjusting the arrangement of the plurality of graphical objects.

The at least one memory and the computer program code may be configured, with the at least one processor, to optimise the interaction metric by calculating the interaction metric for the three-dimensional graphical user interface at a plurality of different adjusted views or for a plurality of different adjusted three-dimensional arrangements, and to cause the view or arrangement having the highest interaction metric to be displayed.

The associated display parameter may comprise a display size of the graphical object. Alternatively, the associated display parameter comprises a virtual distance of the graphical object from the touch-sensitive display.

In a second aspect, this specification describes a method comprising causing a view of a three-dimensional graphical user interface to be displayed on a touch-sensitive display, the three-dimensional graphical user interface comprising a three-dimensional arrangement of a plurality of graphical objects, each of the graphical objects, when displayed, having an associated display parameter, identifying at least one graphical object for which the associated display parameter satisfies a predetermined criterion and enabling individual selectability in respect of the identified at least one graphical object, wherein each individually selectable graphical object is selectable with a touch input and wherein individually selecting a graphical object with a touch input causes an action to be performed in respect of the selected graphical object.

The method may further comprise adapting the appearance of the identified at least one graphical object so as to indicate to a user that the graphical object is individually selectable. The method may further comprise identifying a plurality of the graphical objects for which the associated display parameter does not satisfy the predetermined criterion and causing the three-dimensional arrangement of graphical objects to be adapted by causing the identified plurality of graphical objects for which the associated display parameter does not satisfy the predetermined criterion to be moved into a cluster. The method may further comprise enabling selectability of the cluster via a touch input. The method may further comprise receiving a signal indicative of a touch input having been received in respect of the cluster, responding by changing the point from which the adapted three-dimensional arrangement is viewed until the display parameters associated with each of the graphical objects in the cluster satisfy the predetermined criterion, and enabling the individual selectability of the each of the graphical objects in the cluster.

The method may further comprise causing a handle to be displayed in association with each of the graphical objects for which the display parameter does not satisfy the predetermined criterion, wherein a display parameter associated with at least part of the handle satisfies the predetermined criterion, and enabling selectability of the handle associated with each graphical object.

The method may further comprise receiving a signal indicative a request to change the point from which the three-dimensional graphical user interface is viewed, responding by causing a changed view of the three-dimensional graphical user interface to be displayed on the touch-sensitive display, calculating an interaction metric in respect of the changed view, and optimising the interaction metric by automatically adjusting the point from which the three-dimensional graphical user interface is viewed or by adjusting the arrangement of the plurality of graphical objects.

Optimising the interaction metric may comprise calculating the interaction metric for the three-dimensional graphical user interface at a plurality of different adjusted views or for a plurality of different adjusted three-dimensional arrangements, and cause the view or arrangement having the highest interaction metric to be displayed.

The associated display parameter comprises a display size of the graphical object. Alternatively, the associated display parameter may comprise a virtual distance of the graphical object from the touch-sensitive display.

In a third aspect, this specification describes a non-transitory computer readable memory medium having computer readable instructions stored thereon, the computer readable instructions, when executed by at least one processor, causing the at least one processor to cause a view of a three-dimensional graphical user interface to be displayed on a touch-sensitive display, the three-dimensional graphical user interface comprising a three-dimensional arrangement of a plurality of graphical objects, each of the graphical objects, when displayed, having an associated display parameter, to identify at least one graphical object for which the associated display parameter satisfies a predetermined criterion, and to enable individual selectability in respect of the identified at least one graphical object, wherein each individually selectable graphical object is selectable with a touch input and wherein individually selecting a graphical object with a touch input causes an action to be performed in respect of the selected graphical object.

In a fourth aspect, this specification describes computer-readable code which, when executed by computing apparatus, causes the computing apparatus to perform a method according to the second aspect.

In a fifth aspect, this specification describes apparatus comprising means for causing a view of a three-dimensional graphical user interface to be displayed on a touch-sensitive display, the three-dimensional graphical user interface comprising a three-dimensional arrangement of a plurality of graphical objects, each of the graphical objects, when displayed, having an associated display parameter, means for identifying at least one graphical object for which the associated display parameter satisfies a predetermined criterion and means for enabling individual selectability in respect of the identified at least one graphical object, wherein each individually selectable graphical object is selectable with a touch input and wherein individually selecting a graphical object with a touch input causes an action to be performed in respect of the selected graphical object.

In a fifth aspect, this specification describes apparatus configured to cause a view of a three-dimensional graphical user interface to be displayed on a touch-sensitive display, the three-dimensional graphical user interface comprising a three-dimensional arrangement of a plurality of graphical objects, each of the graphical objects, when displayed, having an associated display parameter, to identify at least one graphical object for which the associated display parameter satisfies a predetermined criterion, and to enable individual selectability in respect of the identified at least one graphical object, wherein each individually selectable graphical object is selectable with a touch input and wherein individually selecting a graphical object with a touch input causes an action to be performed in respect of the selected graphical object.

BRIEF DESCRIPTION OF THE FIGURES

For a more complete understanding of example embodiments, reference is now made to the following description taken in connection with the accompanying drawings in which.

DETAILED DESCRIPTION

Figure 1:
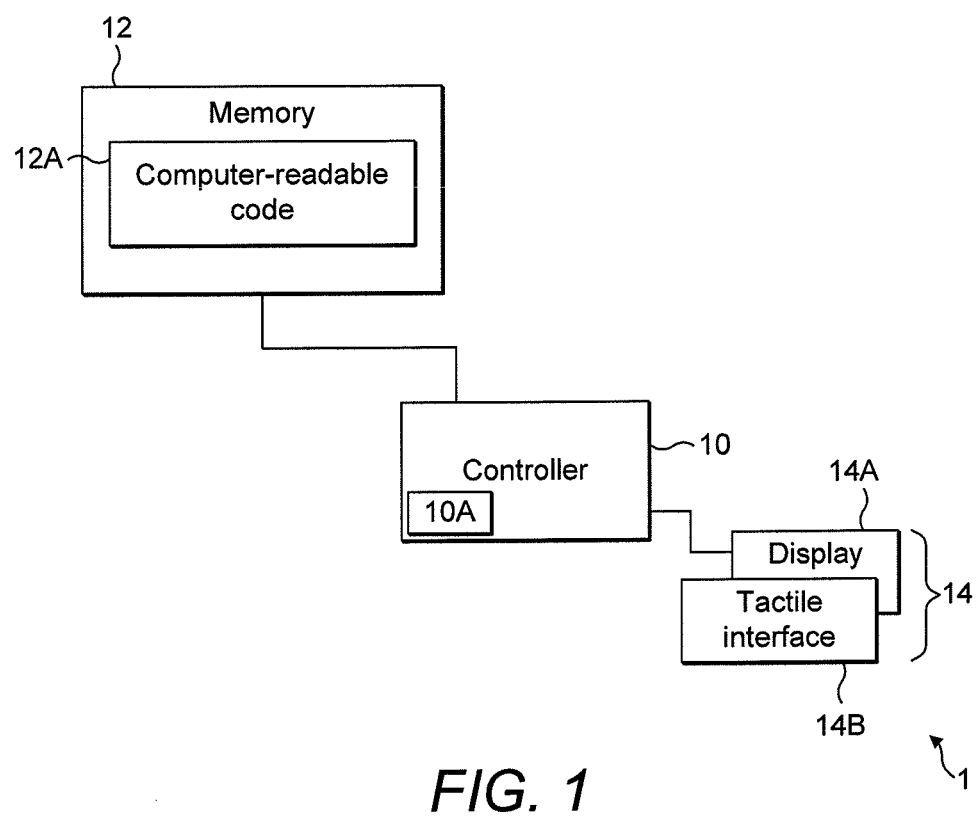
FIG. 1 is a schematic illustration of an apparatus in accordance with example embodiments.

In the description and drawings, like reference numerals refer to like elements throughout.

FIG. 1 is a schematic view of an apparatus 1 in accordance with example embodiments. The apparatus 1 comprises a controller 10, at least one non-transitory memory medium 12 and touch-sensitive display 14. The controller 10 comprises at least one processor 10A and optionally one or more application specific integrated circuits (not shown). The at least one processor 10A is operable to execute computer-readable code 12A stored on the memory 12. The controller 10 is operable under the control of the computer-readable code 12A to control the output of the touch-sensitive display 14. The controller 10 is also operable under the control of the computer-readable code 12A to respond to touch inputs received at the touch-sensitive display 14 and to cause actions to be performed based thereon. Such actions include changing the output of the touch-sensitive display 14. The controller 10 is operable also to cause data to be stored, temporarily or permanently, in the at least one memory 12.

The controller 10 is operable to cause a 3D GUI to be displayed on the touch-sensitive display 14. A 3D GUI comprises a 3D arrangement of graphical objects provided on the display 14. A 3D GUI is based on a three-dimensional data model and comprises a plurality of graphical objects. A graphical object is a representation of graphical data. The graphical data has associated geometric data which defines a location of the graphical object in three-dimensional space. The geometric data may comprise, for example, one or more sets of Cartesian coordinates. The displayed appearance of the 3D GUI is dependent upon the point from which the 3D GUI is viewed. As such, as the point of view (also referred to as the "camera position" or the "viewpoint") is changed, the appearance of the 3D GUI is also changed.

The controller 10 is operable to cause the 3D GUI to be displayed on the touch-sensitive display 14 from many different viewpoints. The viewpoint from which the GUI is displayed may be selected or changed by the user via one or more touch inputs. In some examples the 3D GUI may be navigable in three dimensions. For example, swipe inputs (i.e. movements of the user's finger in one direction along the surface of the touch-sensitive display 14) may be used to move the viewpoint in the direction of movement of the swipe. Alternatively, swipe inputs may be used to rotate the 3D GUI in direction of movement of the swipe. A pinch input (i.e. moving two fingers towards one another on the touch-sensitive display 14) may be used to move the viewpoint in a direction into the display 14. A reverse-pinch input (i.e. moving two fingers away from one another on the touch-sensitive display 14) may be used to move the viewpoint in a direction out of the touch-sensitive display 14. It will of course be appreciated that any suitable type of user input may be used to navigate through the 3D GUI.

The controller 10 may also be operable to change the viewpoint from which the 3D GUI is displayed automatically. The controller 10 may also be operable to adapt the appearance of the 3D GUI by adjusting relative positions of the graphical objects of which the 3D GUI is comprised.

The touch-sensitive display 14 comprises a display part 14A and a part 14B configured to detect touch inputs incident on the touch-sensitive display 14. The display part 14A may comprise any suitable display panel such as, but not limited to, an LED display panel, an LCD display panel, an e-ink display panel or a plasma display panel. The part 14B configured to detect touch inputs may be of any suitable type. Suitable types include capacitive touch-sensitive panels and resistive touch-sensitive panels.

The at least one non-transitory memory medium 12 may be of any type such as, but not limited to, ROM, RAM and flash memory. Where the apparatus 1 comprises plural discrete memory media, some or all of these may be of different types.

The apparatus 1 may be part of a touch-sensitive device. Touch-sensitive devices of which the apparatus 1 may be part include, but are not limited to, mobile telephones, tablet computers, laptop computers, desktop computers, a personal digital assistants (PDA), positioning systems (e.g. GPS receivers) and portable media players.

Figure 2A:
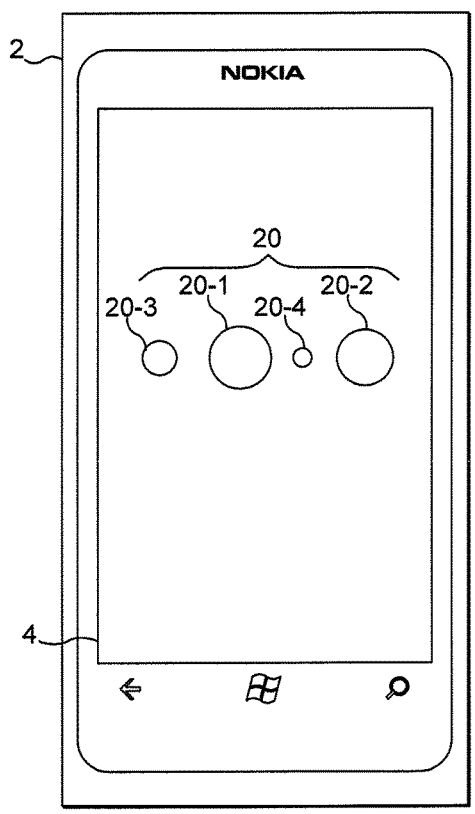
FIG. 2A shows a 3D GUI displayed on a touch-sensitive device.

FIG. 2A shows an example of a touch-sensitive device 2 which includes the apparatus 1 of FIG. 1. In this example, the device 2 is a portable device, specifically a mobile telephone.

Figure 2B:
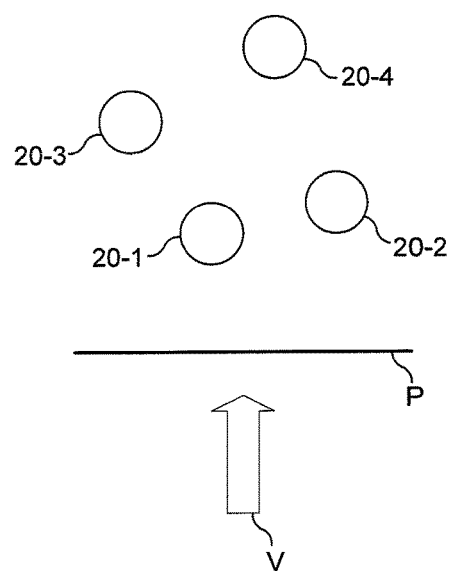
FIG. 2B is a schematic showing the virtual distance from the touch-sensitive display of the graphical objects of the 3D GUI of FIG. 2A.

In FIG. 2A, a simple 3D GUI 20 is being caused to be displayed on the touch-sensitive display 14. In this example, the 3D GUI 20 comprises first to fourth graphical objects 20-1, 20-2, 20-3, 20-4. In this example, the graphical objects are spheres 20-1, 20-2, 20-3, 20-4. Those graphical objects 20-1, 20-2, 20-3, 20-4 of the 3D GUI which are "further away" from the plane of the touch-sensitive display 14 appear to be of a smaller size than those which are closer to the plane of the touch-sensitive display 14. In the view of FIG. 2A, the first graphical object 20-1 is closest to the plane of the display 14, the second graphical object 20-2 is the next closest, the third graphical object 20-3 is the third closest and the fourth graphical object 20-4 is the furthest from the plane of the display 14. The respective distances of the graphical objects 20-1, 20-2, 20-3, 20-4 from the plane of the touch-sensitive display 14 are illustrated in FIG. 2B, which is an imaginary view of the graphical objects of the 3D GUI when viewed from above at a point in a plane that is perpendicular to the plane of the touch-sensitive display 14. The plane of the touch-sensitive display 14 is denoted by the line labelled P, and the direction from which the user views the GUI is shown by the arrow denoted V. It will of course be appreciated that FIGS. 2A and 2B are purely for illustrative purposes and that the differences in the sizes at which objects at different distances from the display are shown may have been exaggerated. In this example, the centres of the graphical objects 20-1, 20-2, 20-3, 20-4 of which the 3D GUI is comprised are all located in the same plane. This is merely for ease of illustration and may not necessarily be the case.

Figure 3A:
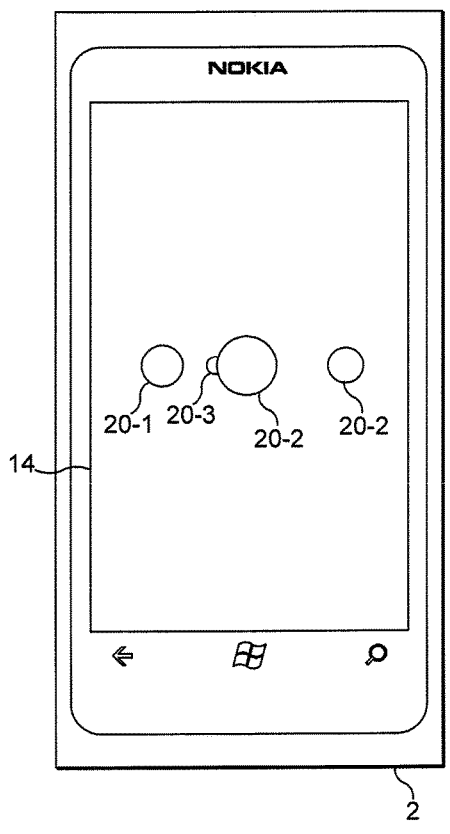
FIG. 3A shows the 3D GUI of FIG. 2A, when displayed at a different rotational orientation.
Figure 3B:
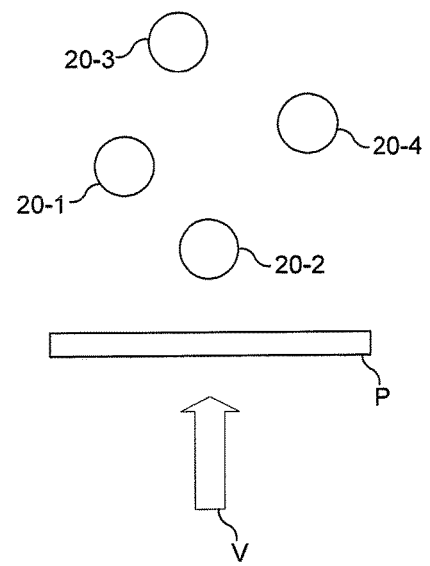
FIG. 3B is a schematic showing the virtual distance from the touch-sensitive display of the graphical objects of the 3D GUI of FIG. 3A.

FIG. 3A shows the 3D GUI of FIG. 2A when viewed from a different viewpoint. In this example, the 3D arrangement of graphical objects 20-1, 20-2, 20-3, 20-4 has been rotated in a clockwise direction by approximately 60 degrees. This change in viewpoint may have been caused, for example, in response to a swipe input moving in a direction from left to right. As can be seen from FIG. 3B, the second graphical object 20-2 is now closest to the plane of the display 14 and the third graphical object 20-3 is the furthest away. Consequently, in FIG. 3A, the second graphical object 20-2 covers the largest display area and the third graphical object 20-3 covers the smallest display area. The graphical objects which cover the smallest area of the display 14 may be too small for a user to select accurately with their finger.

Figure 4:
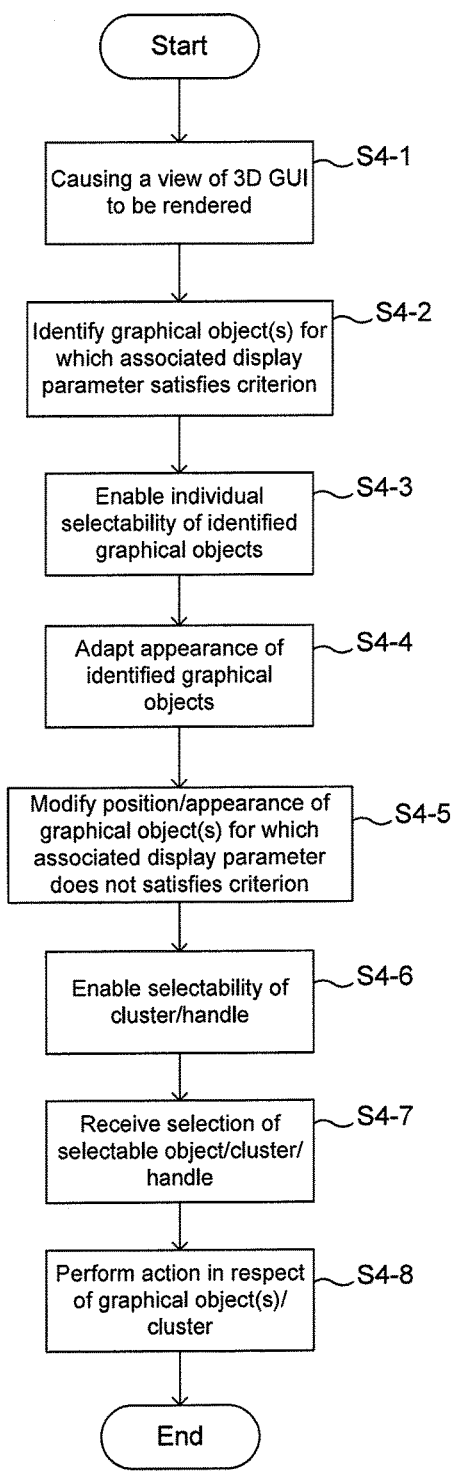
FIG. 4 is a flow chart illustrating a method in accordance with example embodiments.

FIG. 4 is a flow chart depicting an example of a method that may be performed by the controller 10 of the apparatus 1 of FIG. 1.

In step S4-1, the controller 10 causes a view of a 3D graphical GUI 20 (GUI) to be displayed. The view of 3D GUI is based on a 3D data model stored in the memory 12. The 3D GUI 20, when displayed, comprises a plurality of graphical objects 20-1, 20-2, 20-3, 20-4 provided in a three-dimensional arrangement. Each of the graphical objects 20-1, 20-2, 20-3, 20-4 has an associated display parameter. In some examples, the associated display parameter comprises a measure of the size at which the graphical object appears on the display 14. The measure of the size may be, for example, a number of pixels by which graphical object is constituted, a measure of the largest length of the graphical object, or a measure of the area of the display on which graphical object is displayed. In other examples, the display parameter may comprise a "virtual distance" by which the graphical object is displaced from the plane of the display 14. This "virtual distance" may also be referred to as the "z-distance" of a graphical object. The z-distance may be measured from the part of the object that is closest to the display panel.

Next, in step S4-2, the controller 10 identifies those graphical objects 20-1, 20-2 for which the associated display parameter satisfies a predetermined criterion. It will be appreciated that the predetermined criterion depends on the nature of the associated display parameter. For instance, in examples in which the display parameter is a measure of the display size of the graphical object, the predetermined criterion is that the display size of the graphical object must be larger than a predetermined threshold size. A suitable threshold size may be approximately 8 mm. As such, in some examples, only those graphical objects 20-1, 20-2 for which the associated display parameter indicates that at least one dimension as displayed on the display 14 is greater than or equal to 8 mm will be identified in step S4-2. In some examples, the criterion may be that at least part of a graphical object must have two dimensions (e.g. a width and a length) over a threshold size.

In examples in which the display parameter is the virtual distance between the graphical object 20-1, 20-2, 20-3, 20-4 and the plane of the display 14, the predetermined criterion is that the distance must be less than a threshold distance. Put another way, in order to satisfy the predetermined criterion, at least part of the graphical object 20-1, 20-2, 20-3, 20-4 must be situated between the plane of the display 14 and an imaginary threshold plane that is parallel to the plane of the display 14 and is located a threshold distance behind the plane of the display 14.

The step of S4-2 of identifying the graphical objects 20-1, 20-2, 20-3, 20-4 that satisfy the predetermined criterion may comprise comparing the display parameter associated with each of the graphical objects 20-1, 20-2, 20-3, 20-4 with a threshold display parameter. If the associated display parameter is determined to be on the correct side of the threshold parameter, the graphical object is identified as satisfying the predetermined criterion.

Next, in step S4-3, the controller 10 enables the individual selectability of the each of the graphical objects 20-1, 20-2, 20-3, 20-4 for which the associated display parameter satisfies the predetermined criterion. A graphical object 20-1, 20-2, 20-3, 20-4 is individually selectable when it can be interacted with or selected by a touch input that is incident on a location of the display 14 at which the graphical object is provided. The controller 10 is operable under the control of the computer-readable code 12A to respond to a subsequent individual selection of a graphical object by causing an action to be performed in respect of the selected graphical object.

The individual selectability of the graphical objects for which the predetermined criterion is not satisfied is not enabled. As such, these graphical objects cannot be selected or interacted with on an individual basis. Put another way, the controller 10 is configured, under the control of the computer readable code 12A, to disable the individual selectability of those graphical objects for which the associated display parameter does not satisfy the predetermined criterion.

Following step S4-3, the user is able to select or interact with those graphical objects for which the associated display parameter satisfies the predetermined criterion. Those graphical objects which are too small for the user to accurately select or interact with are prevented from being individually selected. This reduces the probability of the user making erroneous selections of graphical objects.

Figure 5A:
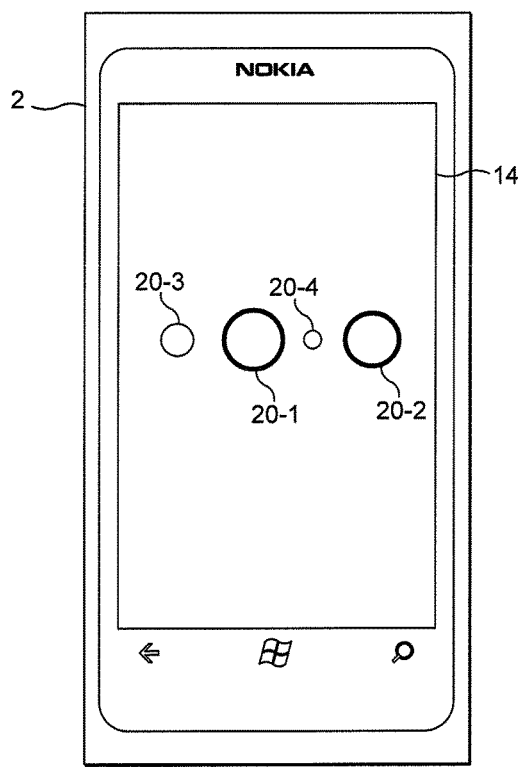
FIGS. 5A and 5B and 6A to 6E illustrate various steps of the method of FIG. 4.
Figure 5B:
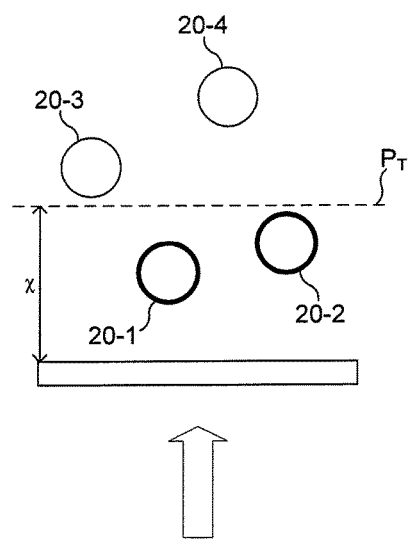

FIGS. 5A and 5B illustrate aspects of the method of FIG. 4. Figure shows 5A shows a view of the 3D GUI that is similar to that shown in FIG. 2A. In FIG. 5A, however, those graphical objects 20-1, 20-2 which are individually selectable (i.e. for which the associated display parameter satisfies the predetermined criterion) are shown with a bold outline. In this example, the criterion may be that at least part of the graphical object as displayed must have dimensions of at least 8 mm×8 mm. Alternatively, as illustrated in FIG. 5B (which is similar to FIG. 2B), the criterion may have been that at least part of the graphical object must be in front of an imaginary threshold plane spaced a distance x from the display 14. The imaginary plane is denoted as PT in FIG. 5B.

Returning now to FIG. 4, after enabling the individual selectability of the graphical objects 20-1, 20-2 for which the display parameter satisfies the predetermined criterion, the method proceeds to step S4-4. In step S4-4, the controller 10 adapts the appearance of those graphical objects for which the individual selectability has been enabled. Adaptation of their appearance allows the user to determine which of the graphical objects can be individually selected or interacted with. The appearance of the graphical objects may be adapted in any suitable way. In some examples, 3D graphical objects for which the associated parameter satisfies the predetermined criterion may be displayed, or rendered, as two dimensional (2D) objects in the plane of the display 14. This may be performed, for example, by replacing the relevant 3D graphical objects with pre-stored 2D images of the graphical object. Alternatively, the relevant 3D graphical objects may be rotated until a main, or primary, face of the object is parallel with the plane of the display screen. Additionally or alternatively, the graphical objects identified in step S4-2 may be provided with visual highlight, such as a halo surrounding the object or simply an emboldened outline (as is shown in FIG. 5A).

Figure 6C:
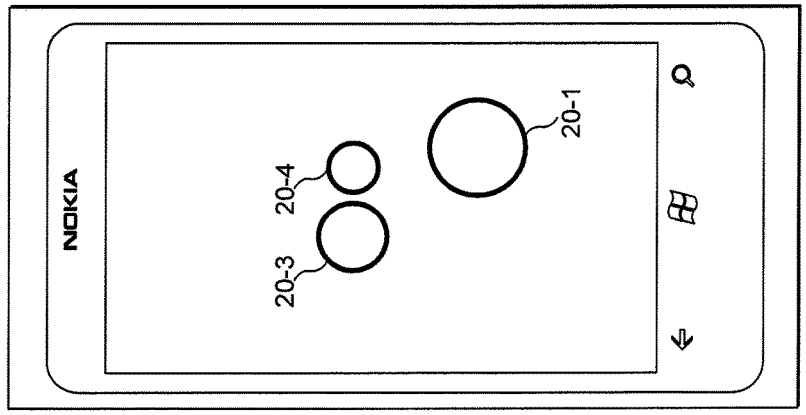

Next, in step S4-5, the controller 10 causes the appearance or positions of one or more of the graphical objects for which the individual selectability has not been enabled to be modified or adapted. For example, as shown in FIG. 6A, the graphical objects which were not identified in step S4-2 (i.e. the third and fourth graphical objects 20-3, 20-4) may be grouped into a cluster 60 at a suitable location on the display. The cluster 60 is configured such that overall size of the cluster 60 is larger than the threshold size for selectability. As such, the graphical objects in a cluster 60 may be spaced further apart in a cluster having a lower number of graphical objects than in a cluster having a higher number of graphical objects. A suitable location may be, for example, one at which no other graphical objects are displayed. The cluster 60 may be spaced from the other graphical objects by more than a threshold distance. If the number of graphical objects for which the predetermined criterion is not met is large, then two or more clusters 60 may be formed. The decision to form more than one cluster may be based on the cumulative display area of all the graphical objects which are to form the cluster 60. In such examples, each of the two or more is of a display size that is above the threshold for selectability. The two or more clusters may be grouped together so as to appear as a single larger cluster. Alternatively, they may be provided on dispersed regions of the display. It will be appreciated that not all graphical objects for which the predetermined criterion is not satisfied may be moved into a cluster. For example, those graphical objects for which the display parameter is does not satisfy a second more lenient criterion, and so which appear to be very small, may not be moved into a cluster.

In other examples, the appearance of the graphical objects 20-3, 20-4 which are not individually selectable may be modified. For example, as shown in FIG. 6D, the appearance of the graphical objects 20-2, 20-3 may be modified to include an interaction handle 62. An interaction handle 62 is another graphical object which is displayed in association with the graphical object 20-2, 20-3, for which individual selectability has not been enabled. The interaction handle 62 may be associated with the graphical object 20-2, 20-3 by visually linking the interaction handle 62 with the graphical object 20-2, 20-3. The interaction handle does not form part of the 3D GUI and may be rendered on an ad-hoc basis. The interaction handle 62 is configured such that a display parameter (e.g. display size or z-distance) associated with at least part of the handle 62 satisfies the predetermined criterion for selectability.

Next in step S4-6, the controller 10 enables the selectability of the cluster 60 or interaction handle 62. As such, the user is able to select the cluster 60 or handle 62 by providing a touch input on the display 14 at a location on which the cluster 60 or handle 62 is displayed. In some examples, the controller 10 may cause the appearance of the cluster 60 or handle 62 to be modified so as to indicate to the user that the cluster 60 or handle 62 may be selected or interacted with.

Next in step S4-7, the controller 10 receives a signal from the touch-sensitive display 14 that is indicative of a selection having been provided in respect of one of the individually selectable graphical objects 20-1, 20-2, or in respect of a cluster 60 or handle 62 caused to be displayed in step S4-5.

Next, in step S4-8, the controller 10 causes an action to be performed in respect of the selected graphical object 20-1, 20-2 or cluster 60. When a handle 62 is selected the controller 10 may cause an action to be performed in respect of the associated graphical object.

Figure 6B:
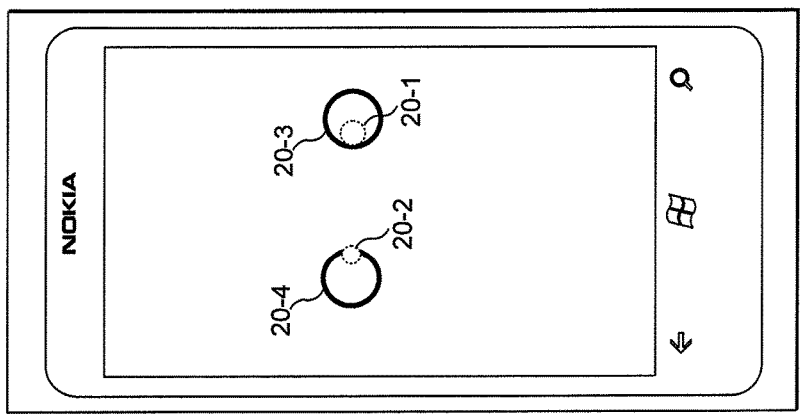
Figure 6A:
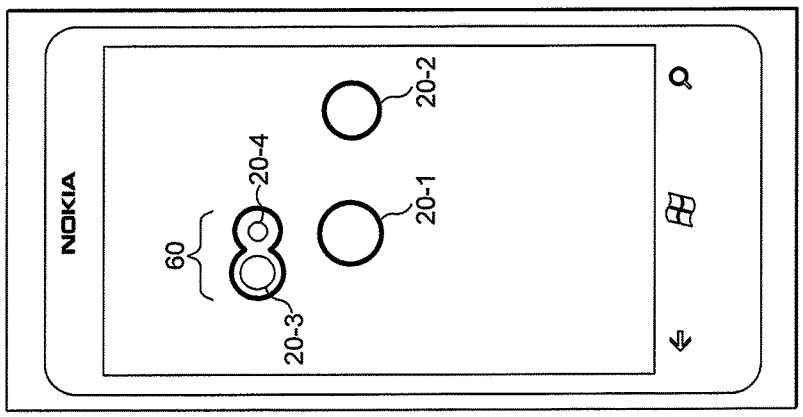
Figure 6D:
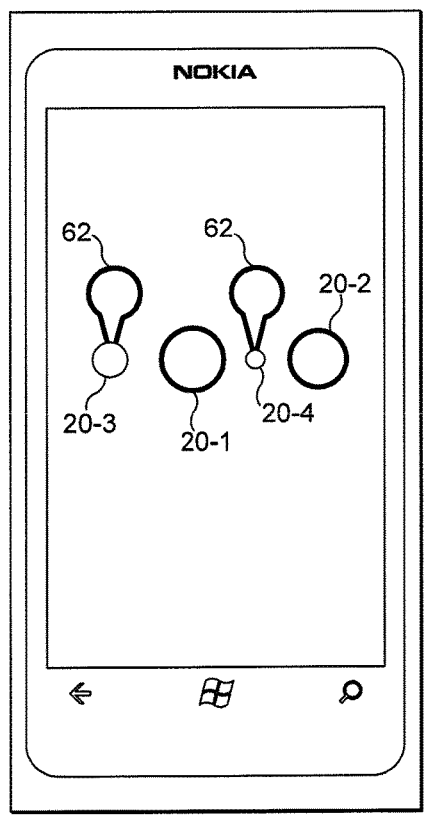
Figure 6E:
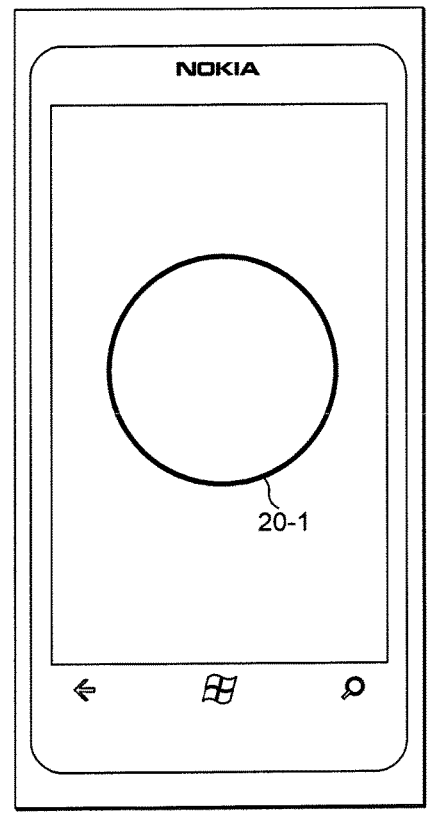

FIG. 6E shows an example of an action that may be performed when a graphical object 20-1, 20-2 or a handle 62 associated with a graphical object 20-3, 20-4 is selected. In this example, the controller 10 simply zooms in on the selected object. It will be appreciated, however, that many different types of action may be performed in respect of a selected graphical object. It will also be appreciated that the action may depend on a type of digital object that the graphical object represents. For example, where graphical objects represent applications, selection of the graphical object may cause the associated application to be executed. Similarly, where a graphical object represents a media file, selection of the graphical object may cause the media file to be presented to the user.

In other examples, when a handle 62 is selected, instead of performing the action in respect of the graphical object 20-3, 20-4 associated with the handle 62, the controller 10 may cause the view of the 3D GUI to transition to a view in which the graphical object 20-3, 20-4 associated with the selected handle 62 becomes individually selectable.

Selection of a cluster 60 of graphical objects, in step S4-8, causes the controller 10 to modify the view of the 3D GUI until the display parameters associated with those graphical objects 20-3, 20-4 in the cluster satisfy the predetermined criterion. In some examples, the controller 10 may revert the 3D GUI back to its original 3D arrangement (prior to its modification in step S4-5). The controller 10 may then change the point from which the 3D GUI is viewed until the display parameters associated with the graphical objects 20-3, 20-4 from the cluster satisfy the predetermined criterion. Subsequently, the controller 10 enables individual selectability of those objects 20-3, 20-4, and of any other graphical objects for which the associated display parameter satisfies the predetermined criterion. In addition, the controller 10 disables the individual selectability of any graphical objects for which the associated display parameter no longer satisfies the predetermined criterion. Steps S4-4 to S4-6 may be performed every time the point from which the 3D GUI is viewed is changed.

FIG. 6B shows an example view of the 3D GUI following the selection of the cluster 60. The controller 10 has responded by causing the 3D GUI to be rotated until the display parameters associated with the third and fourth graphical objects 20-3, 20-3 satisfy the predetermined criterion. The rotation of the 3D GUI has resulted in the display parameters associated with the first and second graphical objects 20-1, 20-2 no longer satisfying the criterion. Consequently, the controller 10 may disable their individual selectability. Both these graphical objects 20-1, 20-2 are now partially obscured by the third and fourth graphical objects. Their locations are shown in dashed lines for illustrative purposes.

FIG. 6C shows a view of the 3D GUI 20 following selection of the cluster 60 according to other examples. In this example, the controller 10 does not cause the 3D GUI 20 to revert to its original 3D arrangement. Instead, it changes the view of the adapted 3D GUI until the display parameters associated with the graphical objects 20-3, 20-4 in the cluster satisfy the predetermined criterion. In the example of FIG. 6C, the controller 10 causes the point from which the adapted 3D GUI is viewed to be moved directly towards the cluster. In other examples, however, the controller 10 may cause the view of the adapted 3D GUI to be rotated or otherwise transitioned until the display parameters associated with the graphical objects 20-3, 20-4 in the cluster 60 satisfy the predetermined criterion.

It will be appreciated from the above description that by clustering the non-individually selectable graphical objects or by providing associated selectable handles 62, example embodiments provide the user of the apparatus with an easy and time-efficient way to select or interact with those graphical objects that previously were not selectable.

Figure 7:
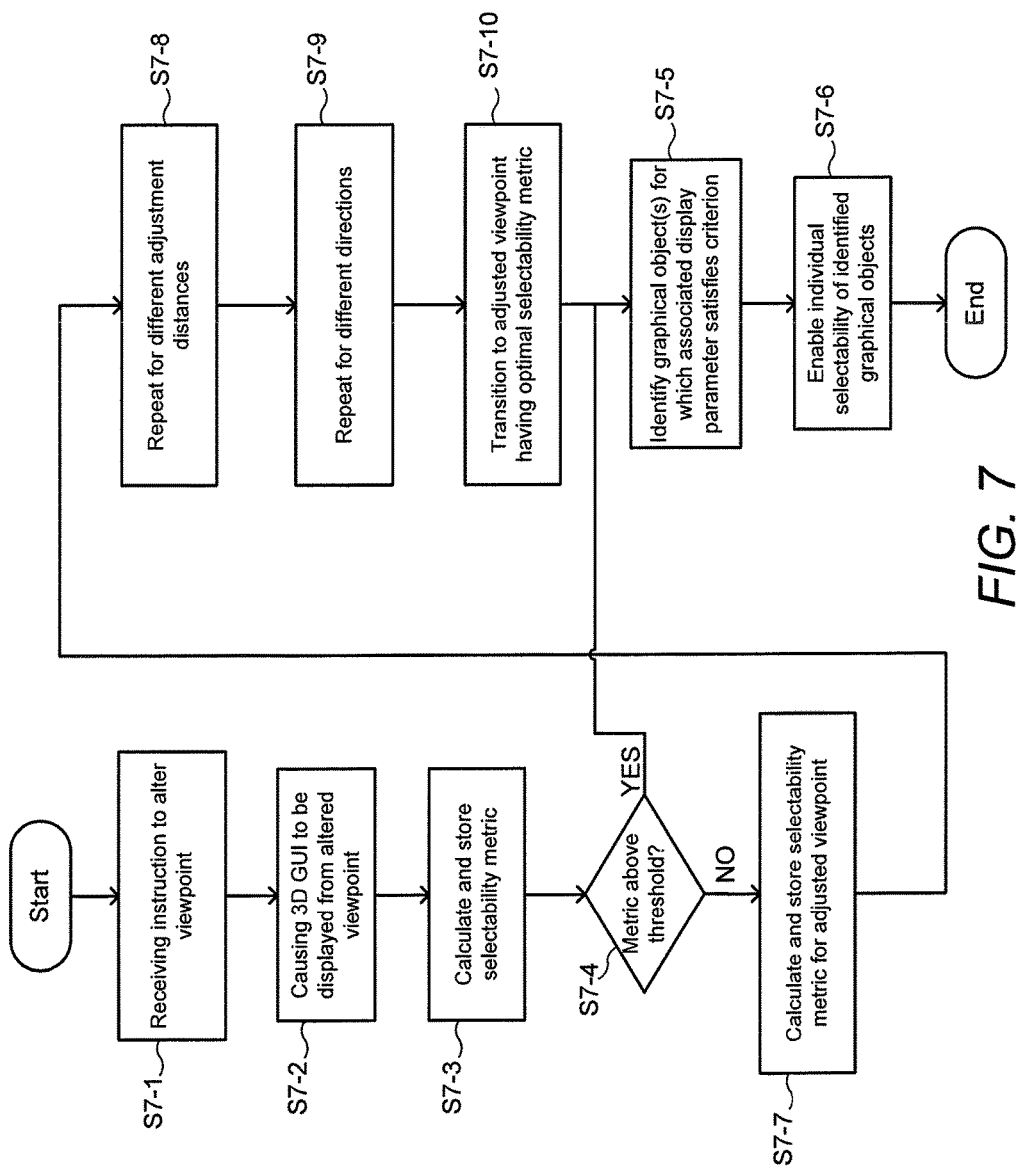
FIG. 7 is a flow chart illustrating an example method for optimising the display of a 3D GUI.

FIG. 7 is a flow chart illustrating operations performed by the apparatus 1 of FIG. 1 in accordance with example embodiments. As will be understood from the below description, steps of the method of FIG. 7 may be supplemental to the method of FIG. 4. The method of FIG. 7 is an example of a way in which the controller 10 may optimise the view of the 3D GUI for improved interaction between the user and the 3D GUI.

In step S7-1, the controller 10 receives an instruction, via the touch-sensitive display 14, to alter the point from which the 3D GUI 20 is viewed. This instruction may be provided using any suitable user input. Step S7-1 may be received, for example, after any of steps S4-3, S4-4 and S4-6 of FIG. 4. As such, an initial view of the 3D GUI is already displayed on the touch-sensitive display 14.

In response to the received instruction, in step S7-2 the controller 10 causes the view of the 3D GUI 20 displayed on the display to be transitioned into the altered view in accordance with received instruction.

Next, in step S7-3, the controller 10 calculates and stores an "interaction metric" based on the view of the 3D GUI 20 that is currently displayed on the display 14. The interaction metric is a measure of the amount of interaction between the user and the graphical objects in the 3D GUI that is possible from the current viewpoint. The interaction metric may be based on a combination of the number of graphical objects 20-1, 20-2, 20-3, 20-4 which can be individually selected by the user and a measure of how easily those objects can be selected. The interaction metric may be calculated based on weighted sum of the number of graphical objects that present an individually selectable area above a minimum defined size, and the size of the presented individually selectable areas. Other criteria may also be taken into account when calculating the interaction metric. These criteria may include prioritization weighting for certain types of graphical objects and the proximity on the display of two or more individually selectable areas. The interaction metric is an indication of the level of touchability of the graphical objects 3D GUI at the current viewpoint. As such, it may be referred to as a touchability indicator.

Subsequently, in step S7-4, it is determined if the interaction metric is above a predetermined threshold (i.e. is at an acceptable level). If it is determined that the interaction metric is above the predetermined threshold, the current view of the 3D GUI 20 is maintained and the method proceeds to steps S7-5 and S7-6. Steps S7-5 and S7-6 are the same as steps S4-2 and S4-3 as described with reference to FIG. 4 in which the controller 10 identifies the graphical objects for which the display parameter satisfies the criterion (step S4-2) and subsequently enables their individual selectability (S4-3). After the controller 10 has performed steps S7-5 and S7-6, it may continue to perform operations equivalent to steps of S4-4 to S4-8 of FIG. 4.

If it is determined in step S7-4, that the interaction metric is below the predetermined threshold, the controller 10 proceeds to step S7-7. In step S7-7, the controller 10 calculates and stores the interaction metric for a view of the 3D GUI 20 that is adjusted from the current view. The adjusted view is a one that is translated or rotated from the current view in a particular direction by a predetermined step distance.

Next, in step S7-8, the controller 10 calculates and stores the interaction metric for a view that is adjusted by an increased step distance in the direction. This step may be repeated as many times as defined by the computer readable code 12A.

Subsequently, in step S7-9, the controller 10 repeats step S7-7 and step S7-8 for a predefined number of different translational and/or rotational directions.

Next, in step S7-10, the controller 10 identifies the adjusted view which yielded the highest interaction metric and transitions the 3D GUI to that view. Subsequently, the controller 10 proceeds to steps S7-5 and S7-6.

It will of course be appreciated that in some example embodiments, the steps of FIG. 7 may be performed in a different order. For instance, in some examples, step S7-4 of determining if the interaction metric is above the predetermined threshold may be carried out each time the interaction metric for an adjusted view is calculated. As soon as a view having a interaction metric above the threshold is identified, the controller 10 causes the 3D GUI to transition to that view. If no view yields a interaction metric above the threshold, the controller 10 transitions the 3D GUI to the view having the highest interaction metric.

Figure 8A:
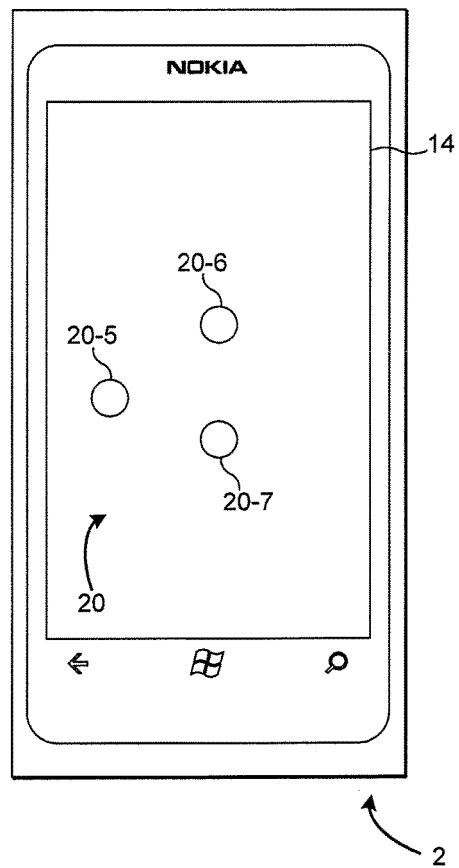
FIGS. 8A and 8B are views of the 3D GUI which serve to illustrate aspects of the method of FIG. 7.
Figure 8B:
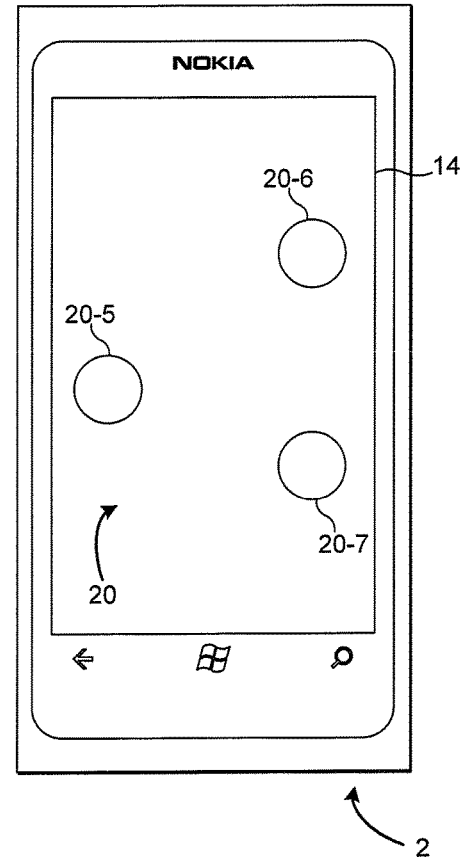

FIG. 8A shows an example of a view of a 3D GUI following a user initiated view transition. In this example, each of the graphical objects 20-5, 20-6 and 20-7 is displayed at a size such that their associated display parameters do not satisfy the predetermined criterion. This fact is reflected in a interaction metric which is below the threshold. Consequently, following steps S7-7 to S7-9 of the method of FIG. 7, an adjusted view with an optimised interaction metric is identified. This optimised view can be seen in FIG. 8B and results from the controller 10 transitioning the point of view in a direction towards the graphical objects 20-5, 20-6, 20-7. In the optimised view, the display parameters associated with all of the graphical objects satisfy the predetermined criterion. Consequently, the controller 10 enables individual selectability in respect of all three graphical objects 20-5, 20-6, 20-7.

Figure 9:
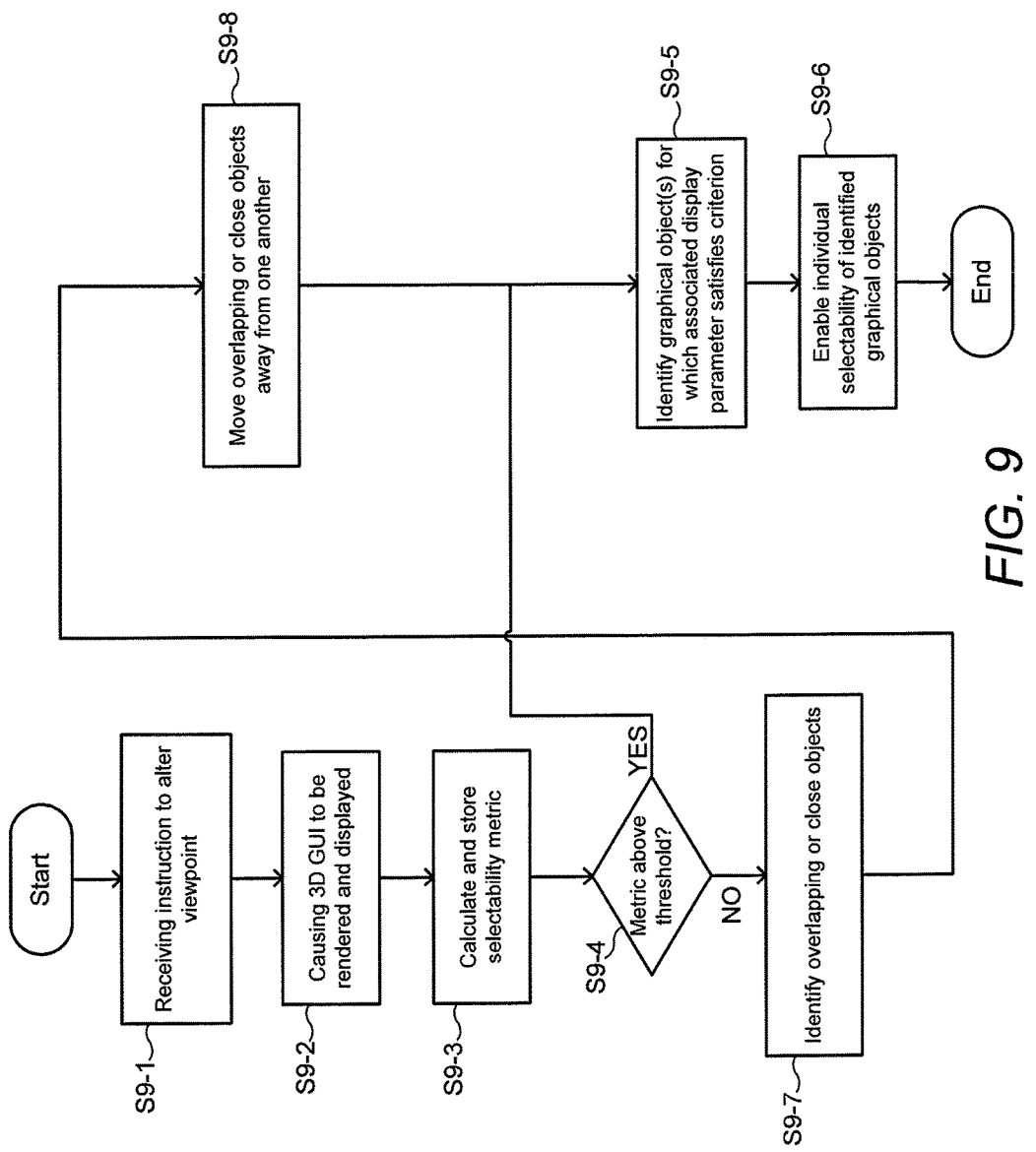
FIG. 9 is a flow chart illustrating an example of another method for optimising the display of the 3D GUI.

FIG. 9 is a flow chart illustrating an example of another method for optimising a interaction metric associated with the 3D GUI. This method addresses the problem of graphical objects which overlap one another or which are so close that the user may not be able to accurately select each one individually.

Steps S9-1 to S9-6 are substantially the same as steps S7-1 to S7-6 of FIG. 7. However, in this example method, following a determination in step S9-4 that the interaction metric is below the threshold, the method proceeds to step S9-7 in which the controller 10 identifies overlapping objects, or objects that are considered too close to one another. This may be based on display location information associated with each of the graphical objects.

Subsequently, in step S9-8, the controller 10 moves the overlapping or close objects away from one another in a direction of a line between their 2D centre points. The controller 10 continues to separate the graphical objects in this manner until it is determined that the objects are spaced apart by more than a threshold distance. It will, of course, be appreciated that alternative algorithms for spacing the graphical objects may be used. For example, the controller 10 may take a horizontal slice through the graphical objects and then measure the smallest distance between them. The controller 10 then calculates the smallest distance between the objects if they were moved apart from one another horizontally by a small amount. This is repeated with an incrementally increasing distance of horizontal movement until the calculated separation is above a threshold. The controller 10 then repeats the process in the vertical direction (i.e. by taking a vertical slices and moving the objects apart vertically).

Subsequently, the controller 10 determines which direction requires the least movement to arrive at the threshold separation and then separates the objects on the display in that direction until the threshold separation is reached.

Subsequently, the method proceeds to step S9-5 and S9-6 in which the controller 10 identifies the graphical objects for which the display parameter satisfies the criterion (step S9-5) and subsequently enables their individual selectability (S9-6).

Figure 10A:
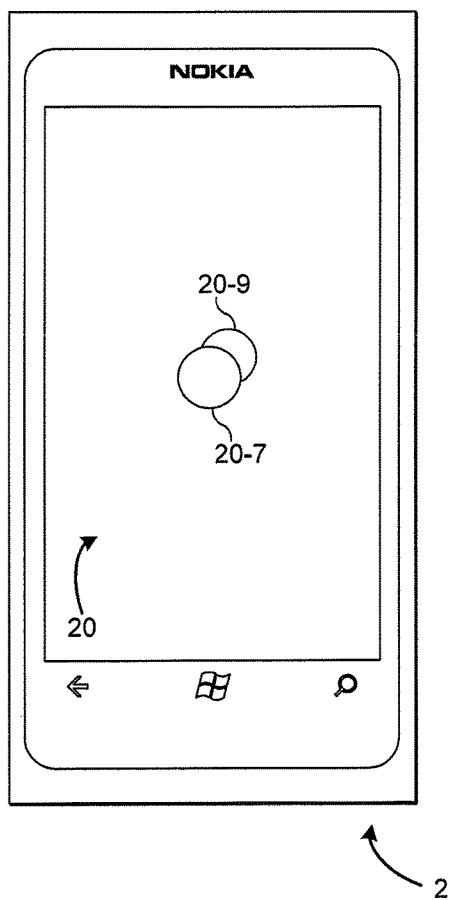
FIGS. 10A and 10B are views of the 3D GUI which serve to illustrate aspects of the method of FIG. 9.
Figure 10B:
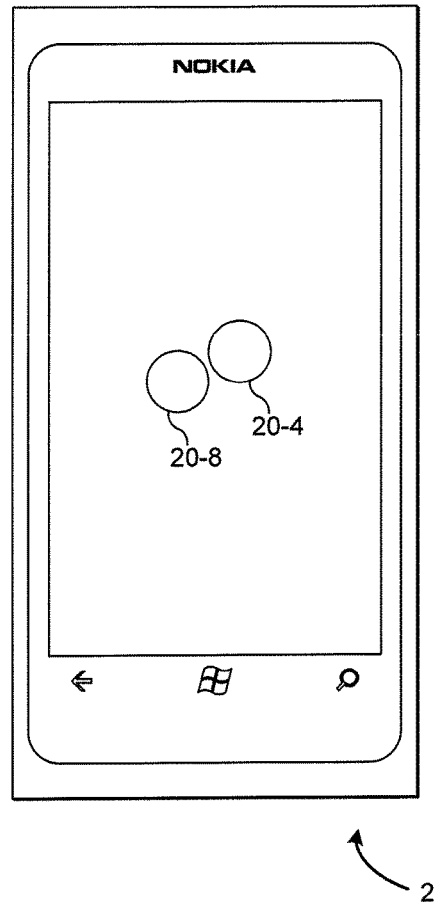

The effect of the method of FIG. 9 can be seen in FIGS. 10A and 10B. FIG. 10A shows a view of the 3D GUI 20 immediately following a user-initiated view transition. As can be seen, two of the graphical objects 20-8-20-9 are displayed as overlapping. This is recognised in step S9-7 and consequently, in step S9-8, the overlapping objects are moved apart from one another. The result of this can be seen in FIG. 10B.

It will of course be appreciated that the example methods of FIGS. 7 and 9 may not be exclusive of one another. For example, steps S9-7 and S9-8 may be performed subsequent to step S7-10 of FIG. 7. Also, as discussed above, the methods of FIGS. 7 and/or 9 may also be incorporated into method of FIG. 4.

A worked example of how the interaction metric may be calculated will now be described with reference to FIGS. 11A and 11B.

Figure 11B:
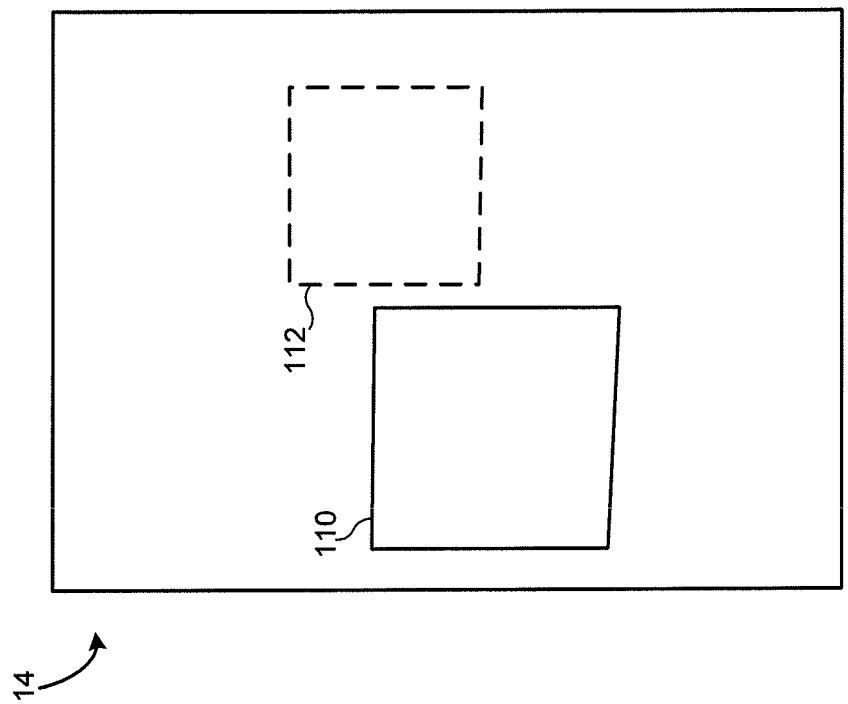
FIGS. 11A and 11B illustrate an optimisation of a view of the 3D GUI in accordance with example embodiments.
Figure 11A:
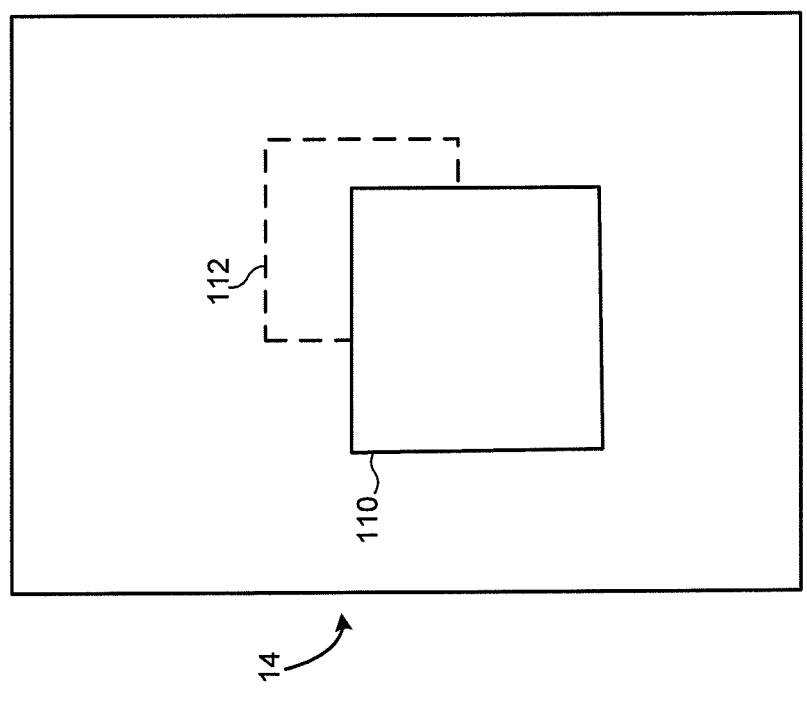

FIG. 11A shows a view of 3D GUI immediately following a user controlled change of viewpoint. In this example, the 3D GUI comprises two planar graphical objects 110, 112. A first of the objects no has a solid outline and the second 112 has a broken outline. In FIG. 11A, the planes of both objects are generally parallel to the plane of the display.

Cartesian coordinates (x, y, z) relating to the objects and the camera are as follows:
first object 110=[−76, 1571, 162];
second object 112=[−385, 1798, 1455];
camera position=[−1043, 1917, −4038]; and
point of interest of camera (i.e. the point on which the camera is focussed)=[−368, 1588, 289].

The x-axis is horizontal and increases from right to left. The y-axis is vertical and increases from down to up. The z-axis is perpendicular to the plane of the display and increases from near to far. Each of the graphical objects no, 112 is of the same objective size. However, because the second object 112 is located further from the plane of the display (i.e. has a higher z-value), it appears smaller. Both objects are displayed at a size that is above the threshold for enabling individual selectability. However, in the current view, the first object 110 is partially obscuring the view of the second object 112. Both objects have the same priority (=1).

Measures of the area of the display on which the objects are provided are as follows:
first object area=1156; and
second object area=396.

In some examples, the interaction metric, $M_I$, may be calculated using the following equation (a, b, c and $A_{min}$ are parameters defined depending on the particular implementation):

$M_I$=a(number of individually selectable objects presenting a visible area>$A_{min}$)+b(smallest visible area)+c(total display area of objects of priority=1)+d(distance between nearest edges of neigbouring individually selectable objects).

Let us assume that, in this implementation, the parameters are: a=800, b=1, c=0.1, and $A_{min}$=500 (note: $A_{min}$ may in some instance also be the threshold size for individual selectability). As such, the interaction metric is as follows:

$M_I$=800(1)+1(396)+0.1(1156+396)+100(0)=1351.

If the threshold for the interaction metric $M_I$ is, for example, 4000 then step S7-4 of FIG. 7 would yield a negative determination. As such the controller 10 then proceeds to steps S7-7 to S7-10 to identify a viewpoint which has a higher interaction metric (preferably in excess of the threshold). FIG. 11B shows an example of such a viewpoint.

In FIG. 11B, the camera has been moved to the right by 1181 units. As such the coordinates for the camera position are now: [−1043, 1917, −4038]. Because the camera position has changed but the point of interest has not, the planes of the two objects 110, 112 are no longer generally parallel to the plane of the display. As such, they no longer appear rectangular, but instead appear slightly skewed. The visible areas of the two objects are as follows:
first object area=900; and
second object area=625.

The interaction metric $M_I$ of the view of FIG. 11B is now 4000 (=800(2)+1(625)+0.1(900+625)+100(2.5)), which is in excess of the threshold. Consequently, the controller transitions to the 3D GUI to this viewpoint which faciliates interaction with the 3D GUI by the user.

It will be appreciated that the examples described herein have many different uses within touchscreen devices. They may be used, for example, for providing a menu system wherein each graphical object in the GUI represents an application for execution. They may also be used for allowing content items, such as picture files, videos files and/or audio files to be browsed, with each graphical object representing a content item or groups of content items. In other applications, the examples herein may be used within a gaming environment, for example as part of a virtual world computer game. It will, of course, be appreciated that the examples described herein are not limited to these specific applications, but may be employed in many other scenarios.

It should be realized that the foregoing embodiments should not be construed as limiting. Other variations and modifications will be apparent to persons skilled in the art upon reading the present application. Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. An apparatus comprising at least one processor and at least one memory including computer program code, the at least one memory and the computer program code configured to, with the at least one processor, cause the apparatus:
to cause a view of a three-dimensional graphical user interface to be displayed on a touch-sensitive display, the three-dimensional graphical user interface comprising a three-dimensional arrangement of a plurality of graphical objects, each of the graphical objects, when displayed, having an associated display parameter, wherein the display parameter comprises a display size;
to identify at least one graphical object for which the associated display size satisfies a predetermined criterion by comparing the display size associated with each of the graphical objects with a threshold, the associated display size satisfying the predetermined criterion in an instance the display size is on a correct side of the threshold;
to identify a plurality of the graphical objects for which the associated display parameter does not satisfy the predetermined criterion;
to cause the three-dimensional arrangement of graphical objects to be adapted by causing the identified plurality of graphical objects for which the associated display parameter does not satisfy the predetermined criterion to be moved into a cluster; and
to enable individual selectability in respect of the identified at least one graphical object for which the associated display size satisfies the predetermined criterion, the individual selectability being disabled for any graphical objects for which the associated display size does not satisfy the predetermined criterion, wherein, in an instance the individual selectability of a graphical object is enabled, the graphical object is individually selectable and wherein individually selecting a graphical object causes an action to be performed in respect of the selected graphical object, and wherein, in an instance the individual selectablility is disabled, the action is not performed in response to user input.

2. The apparatus of claim 1, wherein the at least one memory and the computer program code are configured, with the at least one processor, to cause the apparatus to adapt the appearance of the identified at least one graphical object so as to indicate to a user that the graphical object is individually selectable.

3. The apparatus of claim 1, wherein the at least one memory and the computer program code are configured, with the at least one processor, to cause the apparatus to enable selectability of the cluster via the user input.

4. The apparatus of claim 3, wherein the at least one memory and the computer program code are configured, with the at least one processor, to cause the apparatus:
to receive a signal indicative of the user input having been received in respect of the cluster;
to respond by changing the point from which the adapted three-dimensional arrangement is viewed until the display parameter associated with each of the graphical objects in the cluster satisfy the predetermined criterion; and
to enable the individual selectability of the each of the graphical objects in the cluster.

5. The apparatus of claim 1, wherein the at least one memory and the computer program code are configured, with the at least one processor, to cause the apparatus:
to cause a handle to be displayed in association with each of the graphical objects for which the display parameter does not satisfy the predetermined criterion, wherein a display parameter associated with at least part of the handle satisfies the predetermined criterion; and
to enable selectability of the handle associated with each graphical object.

6. The apparatus of claim 1, wherein the at least one memory and the computer program code are configured, with the at least one processor, to cause the apparatus:
to receive a signal indicative of a request to change the point from which the three-dimensional graphical user interface is viewed;
to respond by causing a changed view of the three-dimensional graphical user interface to be displayed on the touch-sensitive display;
to calculate an interaction metric in respect of the changed view; and
to optimise the interaction metric by automatically adjusting the point from which the three-dimensional graphical user interface is viewed or by adjusting the arrangement of the plurality of graphical objects.

7. The apparatus of claim 6, wherein the at least one memory and the computer program code are configured, with the at least one processor, to cause the apparatus:
to calculate the interaction metric for the three-dimensional graphical user interface at a plurality of different adjusted views or for a plurality of different adjusted three-dimensional arrangements; and
to cause the view or arrangement having the highest interaction metric to be displayed.

8. The apparatus of claim 1, wherein the at least one memory and the computer program code are configured, with the at least one processor, to cause the apparatus to form more than one cluster based on a cumulative display size of the identified plurality of graphical objects which are to form the cluster.

9. A method comprising:
causing a view of a three-dimensional graphical user interface to be displayed on a touch-sensitive display, the three-dimensional graphical user interface comprising a three-dimensional arrangement of a plurality of graphical objects, each of the graphical objects, when displayed, having an associated display parameter, wherein the display parameter comprises a display size;
identifying at least one graphical object for which the associated display size satisfies a predetermined criterion by comparing the display size associated with each of the graphical objects with a threshold, the associated display size satisfying the predetermined criterion in an instance the display size is on a correct side of the threshold;
identifying a plurality of the graphical objects for which the associated display parameter does not satisfy the predetermined criterion;
causing the three-dimensional arrangement of graphical objects to be adapted by causing the identified plurality of graphical objects for which the associated display parameter does not satisfy the predetermined criterion to be moved into a cluster; and
enabling individual selectability in respect of the identified at least one graphical object for which the associated display size satisfies the predetermined criterion, the individual selectability being disabled for any graphical objects for which the associated display size does not satisfy the predetermined criterion, wherein, in an instance the individual selectability of a graphical object is enabled, the graphical object is individually selectable and wherein individually selecting a graphical object causes an action to be performed in respect of the selected graphical object, and wherein, in an instance the individual selectablility is disabled, the action is not performed in response to user input.

10. The method of claim 9, further comprising:
adapting the appearance of the identified at least one graphical object so as to indicate to a user that the graphical object is individually selectable.

11. The method of claim 9, comprising enabling selectability of the cluster via the user input.

12. The method of claim 11, further comprising:
receiving a signal indicative of the user input having been received in respect of the cluster;
responding by changing the point from which the adapted three-dimensional arrangement is viewed until the display parameter associated with each of the graphical objects in the cluster satisfy the predetermined criterion; and
enabling the individual selectability of the each of the graphical objects in the cluster.

13. The method of claim 9, comprising:
causing a handle to be displayed in association with each of the graphical objects for which the display parameter does not satisfy the predetermined criterion, wherein a display parameter associated with at least part of the handle satisfies the predetermined criterion; and
enabling selectability of the handle associated with each graphical object.

14. The method of claim 9, further comprising:
receiving a signal indicative of a request to change the point from which the three-dimensional graphical user interface is viewed;
responding by causing a changed view of the three-dimensional graphical user interface to be displayed on the touch-sensitive display;
calculating an interaction metric in respect of the changed view; and
optimising the interaction metric by automatically adjusting the point from which the three-dimensional graphical user interface is viewed or by adjusting the arrangement of the plurality of graphical objects.

15. The method of claim 14, wherein optimising the interaction metric comprises:
calculating the interaction metric for the three-dimensional graphical user interface at a plurality of different adjusted views or for a plurality of different adjusted three-dimensional arrangements; and causing the view or arrangement having the highest interaction metric to be displayed.

16. The method of claim 9, wherein the associated display parameter further comprises a virtual distance of the graphical object from the touch-sensitive display.

17. Computer-readable code which, when executed by computing apparatus, causes the computing apparatus to perform a method according to claim 9.

18. The method of claim 9, comprising:
causing to form more than one cluster based on a cumulative display size of the identified plurality of graphical objects which are to form the cluster.

19. A non-transitory computer readable memory medium having computer readable instructions stored thereon, the computer readable instructions, when executed by at least one processor, causing the at least one processor:
to cause a view of a three-dimensional graphical user interface to be displayed on a touch-sensitive display, the three-dimensional graphical user interface comprising a three-dimensional arrangement of a plurality of graphical objects, each of the graphical objects, when displayed, having an associated display parameter, wherein the display parameter comprises a display size of the graphical object or a virtual distance of the graphical object from the touch-sensitive display;
to identify at least one graphical object for which the associated display parameter satisfies a predetermined criterion by comparing the display size of the graphical object or the virtual distance of the graphical object from the touch-sensitive display associated with each of the graphical objects with a threshold, the associated display size of the graphical object or the virtual distance of the graphical object from the touch-sensitive display satisfying the predetermined criterion in an instance the display size of the graphical object or the virtual distance of the graphical object from the touch-sensitive display is on a correct side of the threshold;
to identify a plurality of the graphical objects for which the associated display parameter does not satisfy the predetermined criterion;
to cause the three-dimensional arrangement of graphical objects to be adapted by causing the identified plurality of graphical objects for which the associated display parameter does not satisfy the predetermined criterion to be moved into a cluster; and
to enable individual selectability in respect of the identified at least one graphical object for which the associated display size of the graphical object or the virtual distance of the graphical object from the touch-sensitive display satisfies the predetermined criterion, the individual selectability being disabled for any graphical objects for which the associated display size of the graphical object or the virtual distance of the graphical object from the touch-sensitive display does not satisfy the predetermined criterion, wherein, in an instance the individual selectability of a graphical object is enabled, the graphical object is individually selectable and wherein individually selecting a graphical object causes an action to be performed in respect of the selected graphical object, and wherein, in an instance the individual selectablility is disabled, the action is not performed in response to user input.

20. A method comprising:
causing a view of a three-dimensional graphical user interface to be displayed on a touch-sensitive display, the three-dimensional graphical user interface comprising a three-dimensional arrangement of a plurality of graphical objects, each of the graphical objects, when displayed, having an associated display parameter, wherein the display parameter comprises a virtual distance of the graphical object from the touch-sensitive display;
identifying at least one graphical object for which the associated virtual distance satisfies a predetermined criterion by comparing each associated virtual distance of the graphical object from the touch-sensitive display with a threshold, the associated virtual distance satisfying the predetermined criterion in an instance the virtual distance is on a correct side of the threshold;
identifying a plurality of the graphical objects for which the associated display parameter does not satisfy the predetermined criterion;
causing the three-dimensional arrangement of graphical objects to be adapted by causing the identified plurality of graphical objects for which the associated display parameter does not satisfy the predetermined criterion to be moved into a cluster; and
enabling individual selectability in respect of the identified at least one graphical object for which the associated virtual distance satisfies the predetermined criterion, the individual selectability being disabled for any graphical objects for which the associated virtual distance does not satisfy the predetermined criterion, wherein, in an instance the individual selectability of a graphical object is enabled, the graphical object is individually selectable and wherein individually selecting a graphical object causes an action to be performed in respect of the selected graphical object, and wherein, in an instance the individual selectablility is disabled, the action is not performed in response to user input.

21. An apparatus comprising at least one processor and at least one memory including computer program code, the at least one memory and the computer program code configured to, with the at least one processor, cause the apparatus to:
cause a view of a three-dimensional graphical user interface to be displayed on a touch-sensitive display, the three-dimensional graphical user interface comprising a three-dimensional arrangement of a plurality of graphical objects, each of the graphical objects, when displayed, having an associated display parameter, wherein the display parameter comprises a virtual distance of the graphical object from the touch-sensitive display;
identify at least one graphical object for which the associated virtual distance satisfies a predetermined criterion by comparing each associated virtual distance of the graphical object from the touch-sensitive display with a threshold, the associated virtual distance satisfying the predetermined criterion in an instance the virtual distance is on a correct side of the threshold;
identify a plurality of the graphical objects for which the associated display parameter does not satisfy the predetermined criterion;
cause the three-dimensional arrangement of graphical objects to be adapted by causing the identified plurality of graphical objects for which the associated display parameter does not satisfy the predetermined criterion to be moved into a cluster; and
enable individual selectability in respect of the identified at least one graphical object for which the associated virtual distance satisfies the predetermined criterion, the individual selectability being disabled for any graphical objects for which the associated virtual distance does not satisfy the predetermined criterion, wherein, in an instance the individual selectability of a graphical object is enabled, the graphical object is individually selectable and wherein individually selecting a graphical object causes an action to be performed in respect of the selected graphical object, and wherein, in an instance the individual selectablility is disabled, the action is not performed in response to user input.

* * * * *